United States Patent [19]

Matzek

[11] Patent Number: 5,533,055
[45] Date of Patent: Jul. 2, 1996

[54] CARRIER TO INTERFERENCE RATIO MEASUREMENT

[75] Inventor: Lester T. Matzek, Lombard, Ill.

[73] Assignee: Motorola, Inc., Schaumburg, Ill.

[21] Appl. No.: 456,329

[22] Filed: Jun. 1, 1995

Related U.S. Application Data

[63] Continuation of Ser. No. 7,223, Jan. 22, 1993, abandoned.

[51] Int. Cl.$^6$ ............................ H04L 25/08; H04B 15/00
[52] U.S. Cl. ............................................ 375/286; 375/346
[58] Field of Search ...................... 375/224, 227, 375/286, 287, 317, 340, 346, 348; 455/67.1, 67.3, 226.1, 226.3, 296

[56] References Cited

U.S. PATENT DOCUMENTS

| | | | |
|---|---|---|---|
| 3,683,278 | 8/1972 | Ohnsorge et al. | 375/334 |
| 4,309,772 | 1/1982 | Kloker et al. | 375/317 |
| 4,416,017 | 11/1983 | Jasper et al. | 375/346 |
| 4,553,102 | 11/1985 | Yoshida | 375/287 |
| 4,561,114 | 12/1985 | Kozono et al. | 455/226 |
| 4,696,027 | 9/1987 | Bonta | 379/60 |
| 4,731,586 | 3/1988 | Perkins | 455/226.3 |
| 4,860,010 | 8/1989 | Iwamatsu | 375/287 X |
| 5,148,449 | 9/1992 | Cannalte et al. | 375/318 |
| 5,204,879 | 4/1993 | McConnell | 375/293 |
| 5,347,542 | 9/1994 | Kurby et al. | 375/286 |

OTHER PUBLICATIONS

"Mobile Cellular Telecommunications Systems", William C. Y. Lee, McGraw-Hill, 1989, p. 271.
"Digital Modulation Techniques in an Interference Environment", Multi-Volume EMC Encyclopedia Series, vol. IX, Dro. Kamilo Feher, pp. 8.4–8.7.
"Mobile Cellular Telecommunications Systems", William C. Y. Lee, McGraw-Hill, 1989, pp. 183–184, 209.
35th IEEE Vehicular Technology Conference, May 21–23, 1985, Boulder, Co., "Cochannel Interface Measurement in Mobile Radio Systems", Shigeru Kozono and Masayuki Sakamoto, pp. 60–66.

*Primary Examiner*—Young T. Tse
*Attorney, Agent, or Firm*—Susan L. Lukasik

[57] ABSTRACT

An apparatus for measuring carrier to interference ratio for a digital signal receives (101) a digital signal. The digital signal is sampled (113), producing a sampled digital signal. Variations of at least one level of the sampled digital signal are detected (123), producing carrier to interference ratio.

10 Claims, 3 Drawing Sheets

CARRIER TO INTERFERENCE RATIO MEASUREMENT

This is a continuation of U.S. patent application Ser. No. 08/007,223, filed Jan. 22, 1993 and now abandoned.

FIELD OF THE INVENTION

This invention relates to digital communications, including but not limited to measurement of digital signal quality.

BACKGROUND OF THE INVENTION

In digital transmission of information, it is desired to assess signal quality for a variety of reasons. For example, channel assignment decisions in trunked communication systems, such as cellular telephone systems or trunked dispatch systems, are carried out by some form of central controller in response to channel requests from a plurality of communication units. With a signal quality measurement for each of the available channels in the system, the central controller can avoid undesirable channel conditions such as co-channel interference from other trunked or conventional systems. Such a measurement is also useful in selecting particular transmission lines for wireline or fiber optic transmissions.

The communication units, also called subscribers, are arranged in talk groups and may be located anywhere within the system (in the coverage area of any base site). At times, when a mobile communication unit is active in a group or individual call, the mobile unit travels out of the coverage area of its current site, causing the call to become degraded and even lost. The call may then be handed off to another site for completion. Use of signal quality measurements help make call hand-offs less troublesome by avoiding channels with high levels of noise. Thus, when determining if a channel is available at a site, it is desirable for the central controller to assign a channel with the least amount of co-channel interference, such that the present call may be continued without interruption or degraded reception. A number of methods of channel selection exist, including signal detection and signal quality measurement techniques.

An existing method of signal detection starts a timer as soon as a simple carrier is detected (above a preset signal level threshold) on one of the inbound voice channels. The timer continues to run as long as the carrier remains present. A break in the carrier resets and turns off the timer. When the timer expires, i.e., reaches a predetermined value, say, 50 seconds, the channel is considered to have undesired interference and is taken out of service for a period of time, such as 5 minutes. This carrier detection method is best suited to detect the class of interference called intermodulation, which is very common at more congested antenna sites. It is not suited to instantaneously and reliably detect the presence of a true co-channel user.

Signal quality measurement techniques include bit error rate (BER) measurement, in which the number of digital data bits that are incorrectly received are counted, and signal-to-noise ratio (SNR) measurement, which takes the ratio of signal strength to noise strength. BER and SNR measurements tend to be non-linear and do not give early detection, e.g., at low BER or high SNR, of co-channel interference because the measurement techniques are slower than what is needed for an expeditious hand-off or channel assignment.

Accordingly, there is a need for a method of co-channel interference measurement that can quickly and reliably measure co-channel interference.

DESCRIPTION OF A PREFERRED EMBODIMENT

The following describes a method and apparatus that quickly and reliably detects and measures co-channel interference. A received signal is subjected to a sample and hold circuit, the output of which is full-wave rectified about the center decision point. The resultant signal is subsequently full-wave rectified at different decision levels until the expected signal is essentially a single level signal. Any deviations from this level represent noise and interference from other signals on the same channel.

Figure 1:
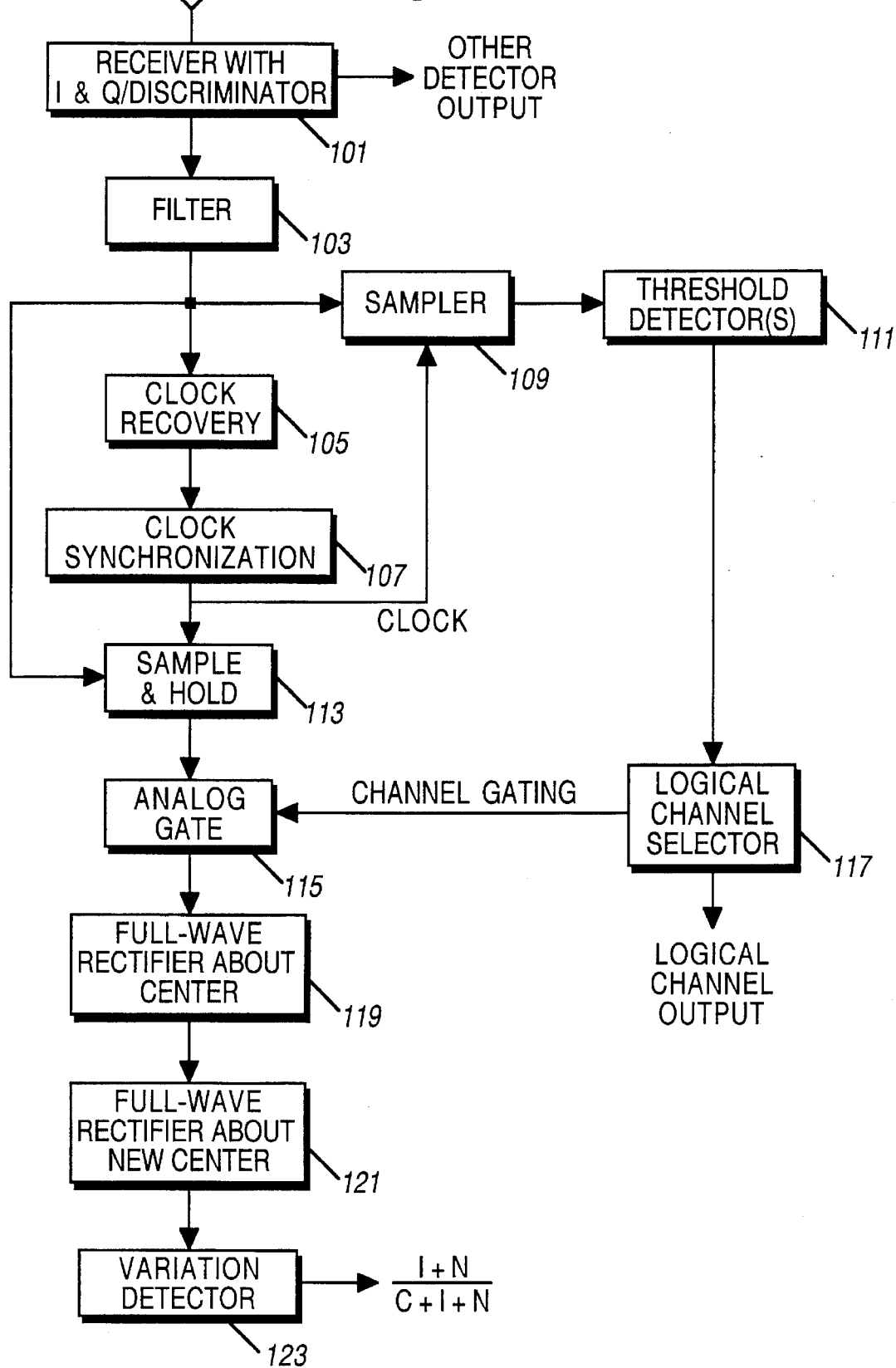
FIG. 1 is a block diagram of a receiver with carrier to interference ratio processing in accordance with the invention.

FIG. 1 shows a radio receiver in accordance with the invention. A receiver with a discriminator 101 receives, demodulates if necessary, and discriminates the digital information. The output of the discriminator 101 is input to a filter 103 for any necessary filtering. The output of the filter 103 is input to a clock recovery circuit 105. The clock recovery circuit 105 and clock synchronization circuit 107 recover and synchronize a clock signal from the incoming data. The output of the clock synchronization circuit 107 is input to a sample and hold circuit 113 in the form of a clock signal. The filter 103 output is also input to sample and hold circuit 113. The sample and hold circuit 113 samples the filter 103 output using the clock signal and holds the signal as is conventionally known in the art. The sample and hold circuit 113 output is input to an analog gate 115.

The clock signal from the clock synchronization circuit 107 is also input to a sampler 109, which also receives the filter 103 output. The sampler 109 output is fed into a threshold detector(s) 111, where each signal decision threshold is determined. For example, a 4-level signal has three decision thresholds. The threshold detector 111 output is input to a logical channel selector 117. The logical channel selector 117 selects the appropriate channel between the different received channels, such as different TDM (time-division multiplexed) channels in a communication system. The channel selector block 117 outputs the logical channel output to the rest of the receiver and also outputs channel gating information to the analog gate block 115 to provide the proper data at the receiver. The analog gate 115 output is input to full-wave rectifier 119. For signals that are not a multiplex of different signal paths, the analog gate 115 is not needed. If a TDM or other multi-channel receiver requiring channel selection is not present, the analog gate 115 and the logical channel selector 117 are not present, and the sample and hold circuit 113 output is fed into full-wave rectifier 119.

In the present case, a 4-level signal is assumed. A first full-wave rectifier 119 performs full-wave rectification about the center decision level of the 4-level signal. The output of full-wave rectifier 119 is input to a second full-wave rectifier 121, which performs full-wave rectification about a new center, which is the decision level above the center decision level. The output of full-wave rectifier 121 is input to a variation detector 123. The variation detector 123 may be a conventional peak-to-peak detector, a conventional peak detector, an average detector, and AC (alternating current) detector, or other type of signal detector, and adjustments to the measurement are made accordingly. The output of variation detector 123 is an interference measurement known as interference to carrier ratio, or (I+N)/(C+I+N), where I represents interference strength, N represents noise strength, and C represents carrier strength. The reciprocal of interference to carrier ratio is carrier to interference ratio, or 1/[(I+N)/(C+I+N)] which equals (C+I+N)/(I+N).

Figure 2A:
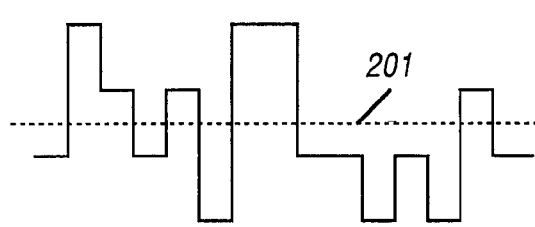
FIG. 2A is a timing diagram of a sample and hold output without interference in accordance with the invention.
Figure 2B:
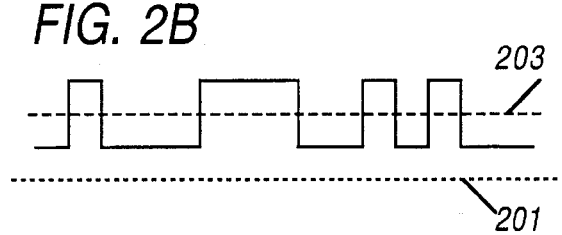
FIG. 2B is a timing diagram showing full-wave rectification of the sample and hold output without interference in accordance with the invention.
Figure 2C:
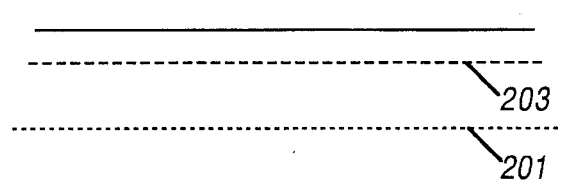
FIG. 2C is a timing diagram showing full-wave rectification about a new center without interference in accordance with the invention.

The timing diagrams of FIG. 2A, FIG. 2B, and FIG. 2C show a 4-level signal, received without interference (or noise) as applied to the full-wave rectifiers 119 and 121. FIG. 2A shows a sample and hold 113 output without interference. The short-dashed line represents the center line 201 or center decision level of the 4-level signal. FIG. 2B shows the first full-wave rectification of the sample and hold output signal of FIG. 2A, where the rectification takes place about the center line 201 of FIG. 2A, which line is the short-dashed line of FIG. 2B, as is shown without interference. The long-dashed line of FIG. 2B is the new center line 203. FIG. 2C shows the second full rectification, which takes the signal from FIG. 2B and full-wave rectifies it about the new center line 203, as is shown without interference. As is clearly seen in FIG. 2C, once full-wave rectification is performed twice on the same digital signal with a 4-level output, the resultant signal is essentially a single level signal when no interference is present. As can be seen from the diagrams, full-wave rectification of a digital signal has the appearance of folding the signal about a center line.

Figure 3A:
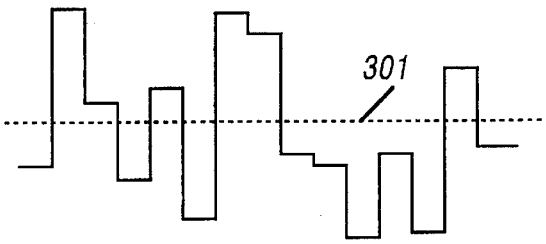
FIG. 3A is a timing diagram of a sample and hold output with interference in accordance with the invention.
Figure 3B:
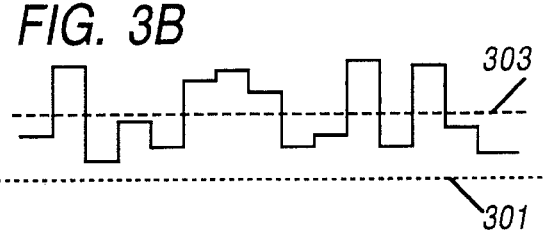
FIG. 3B is a timing diagram showing full-wave rectification of the sample and hold output with interference in accordance with the invention.
Figure 3C:
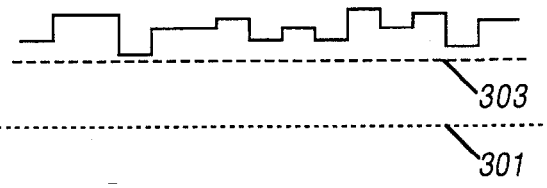
FIG. 3C is a timing diagram showing full-wave rectification about a new center with interference in accordance with the invention.

FIG. 3A represents a signal that is sample and hold output with interference. The short-dashed line represents the original center line 301 of decision for the original signal. FIG. 3B shows full-wave rectification of the sample and hold signal about the center line 301 shown with interference. The long-dashed line shown is the new center line 303. FIG. 3C shows full-wave rectification of the signal of FIG. 3B about the new center line 303 shown with interference. As can be seen in FIG. 3C, the interference signal is shown because the line is not a straight line and all information shown which is not straight represents the signal strength of the interference signal.

Figure 4A:
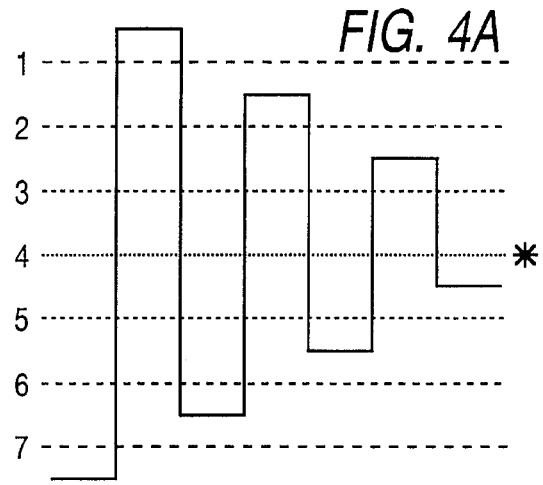
FIG. 4A is a timing diagram of a sample and hold output of an 8-level signal without interference in accordance with the invention.
Figure 4B:
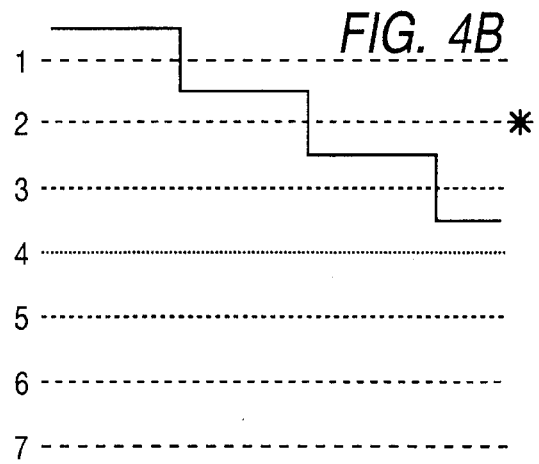
FIG. 4B is a timing diagram showing full-wave rectification of the 8-level signal about a first center line of the sample and hold output without interference in accordance with the invention.
Figure 4C:
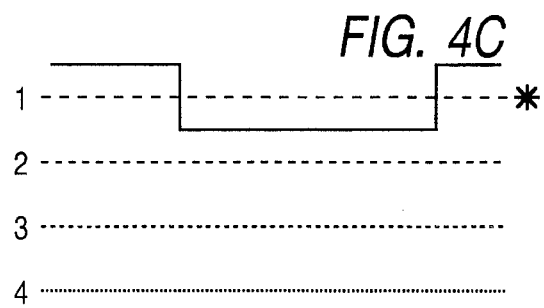
FIG. 4C is a timing diagram showing full-wave rectification of the 8-level signal about a second center line without interference in accordance with the invention.
Figure 4D:
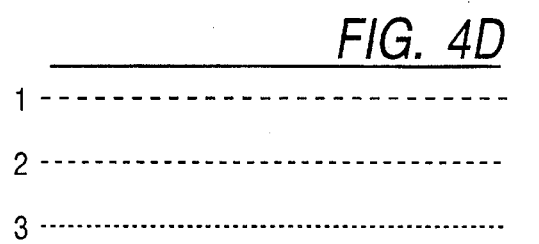
FIG. 4D is a timing diagram showing full-wave rectification of the 8-level signal about a third center line without interference in accordance with the invention.

FIG. 4A shows an 8-level signal with seven decision levels shown in varying dashed or dotted lines. Threshold line 4, which is designated with an asterisk, shows the first level of full-wave rectification or folding. The result of this full-wave rectification is shown in FIG. 4B. The asterisk on level 2 in FIG. 4B shows the next level of full-wave rectification, and the result of this full-wave rectification is shown in FIG. 4C. The asterisk on threshold level 1 of FIG. 4C shows the level of full-wave rectification for the signal in FIG. 4C, the result of which is shown in FIG. 4D. The example in FIGS. 4A, 4B and 4C and 4D are shown without interference for the sake of clarity. Levels 5, 6, and 7 of FIG. 4C and levels 4, 5, 6, and 7 of FIG. 4D are not shown for sake of clarity. There is no information below the fourth decision level in FIG. 4B, FIG. 4C, and FIG. 4D.

A signal must be full-wave rectified or folded until an ideal signal the same number of levels would first be full-wave rectified into a straight line. For example, one fold would take care of a 2-level signal, or $2^1=2$ levels maximum. Two folds would handle a 3-level or 4-level signal, or $2^2=4$ levels maximum. A 3-level signal is folded twice, and the same procedure used for a 4-level signal is performed, only the fourth level of the signal is empty, as if a 4-level signal is transmitted without data at the fourth level. Similarly, three folds are required for signals having 5, 6, 7 or 8 levels. Four folding levels are used for signals having 9, 10, 11, 12, 13, 14, 15, or 16 levels, and so forth. As may be recognized by one of skill in the art, this particular technique may be extended to essentially an infinite number of levels.

Figure 5A:
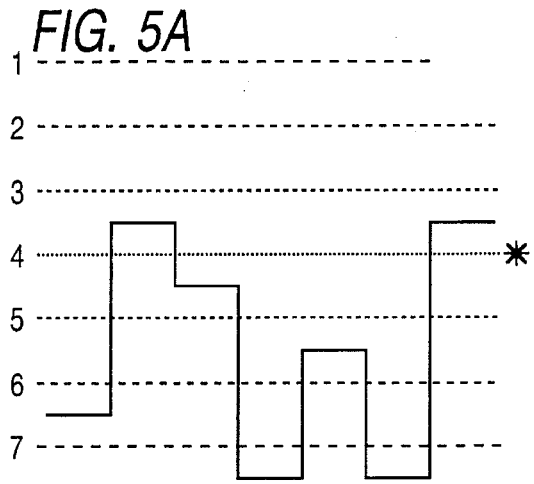
FIG. 5A is a timing diagram of a sample and hold output of a 5-level signal without interference in accordance with the invention.
Figure 5B:
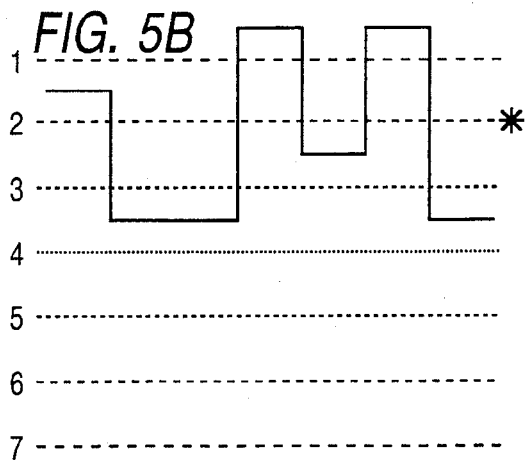
FIG. 5B is a timing diagram showing full-wave rectification of the 5-level signal about a first center line of the 5-level sample and hold output without interference in accordance with the invention.
Figure 5C:
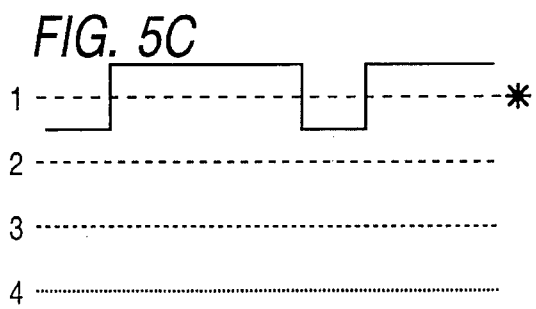
FIG. 5C is a timing diagram showing full-wave rectification of the 5-level signal about a second center line without interference in accordance with the invention.
Figure 5D:
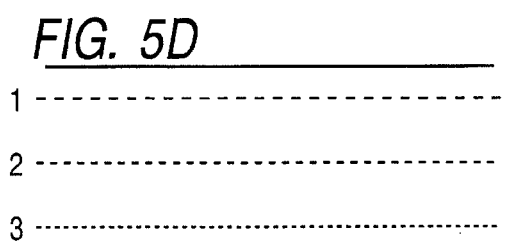
FIG. 5D is a timing diagram showing full-wave rectification of the 5-level signal about a third center line without interference in accordance with the invention.

FIG. 5A shows a 5 level signal. This 5-level signal is transposed onto an 8-level decision network using three empty levels. As long as the input signal is kept intact, it does not matter which five consecutive levels are used for the initial folding stage. Folding takes place in the same manner as shown in FIGS. 4A, 4B, 4C, and 4D. The first folding level is level 4 as shown by the asterisk in FIG. 5A. The result of this first full-wave rectification is shown in FIG. 5B. The second folding level is level 2, shown by the asterisk in FIG. 5B, and the result of the rectification about the second level is shown in FIG. 5C. Level 1 in FIG. 5C designated by the asterisk shows the final level of rectification, the result of which is shown in FIG. 5D. The resultant straight line designates no interference in the signal. As with FIG. 4C, FIG. 5C does not show levels 5, 6, and 7 because they are empty levels and FIG. 5D does not shown levels for 5, 6, and 7 as with FIG. 4D because they are also empty levels.

Thus, using this folding technique takes a received digital signal containing any number of levels and full-wave rectifies it into a single expected signal level. If the received digital signal contains no noise or interference from other signals, the result of folding is a signal at the expected signal level, with no variations. If the received digital signal contains noise or interference from other signals, the result of folding is a signal that varies from the expected signal level, and the difference between the folded signal and the expected signal level is a measurement of carrier to interference ratio. The expected signal level may be a signal generated internally by the receiver, or may be stored or calculated if the invention is implemented in a DSP (digital signal processor), such as a DSP 56001 available from Motorola, Inc.

The folding technique is only one embodiment of the basic invention, which detects the variation in one or more levels of a digital signal at the output of the analog gate, which levels would have no variation from the expected level if the transmission was undisturbed. In an alternative embodiment, a detector is active over a small range of voltage about one of the expected signal levels that would result from an undisturbed signal, and no full-wave rectification is used, i.e., the output of analog gate 115 goes directly into variation detector 123. For a multi-level signal, only one level is used, and thus more symbols are required to detect variation. This is therefore a slower embodiment, but still faster than a BER detector for high BER.

The invention therefore shows a technique for isolating an interference signal in an accurate manner so as to quickly and accurately determine any level of interference for a signal.

What is claimed is:

1. An apparatus for measuring quality of a digital signal, the apparatus comprising:

a receiver for receiving the digital signal;

a sampler for sampling the received digital signal, thereby producing a sampled digital signal;

a full-wave rectifier, arranged and constructed to full-wave rectify the sampled digital signal, thereby producing a full-wave rectified signal; and a detector, arranged and constructed to detect variations between the full-wave rectified signal and an expected signal level, thereby producing an interference measurement.

2. The apparatus of claim 1, wherein the interference measurement is carrier to interference ratio.

3. A method of measuring quality of a digital signal, comprising the steps of:

receiving the digital signal;

sampling the received digital signal, thereby producing a sampled digital signal;

full-wave rectifying the sampled digital signal, producing a full-wave rectified signal; and detecting variations between the full-wave rectified signal and an expected signal level, producing an interference measurement.

4. The method of claim 3, wherein the interference measurement is carrier to interference ratio.

5. An apparatus for measuring interference associated with a received digital signal, the apparatus comprising:

a sample and hold circuit that samples and holds the received digital signal and outputs a sampled digital signal;

a first rectifier, operatively coupled to the sample and hold circuit, that full-wave rectifies the sampled digital signal about a first level, thereby producing a rectified signal;

a second rectifier, operatively coupled to the first rectifier, that full-wave rectifies the rectified signal about a second level, thereby producing a twice-rectified signal; and a peak detector, operatively coupled to the second rectifier, that detects and measures variations between the twice-rectified signal and the second level, thereby producing an interference measurement.

6. A method of measuring interference associated with a received digital signal, comprising the steps of:

sampling and holding the received digital signal and outputing a sampled digital signal;

full-wave rectifying the sampled digital signal about a first level, thereby producing a rectified signal;

full-wave rectifying the rectified signal about a second level, thereby producing a twice-rectified signal; and detecting and measuring variations between the twice-rectified signal and the second level, thereby producing an interference measurement.

7. An apparatus for measuring interference associated with a received digital signal, the apparatus comprising:

a circuit that samples the received digital signal, thereby producing a sampled signal;

at least one rectifier that full-wave rectifies the sampled signal into a rectified signal, such that the rectified signal reflects an expected signal level only when noise and interference are absent from the received digital signal; and a detector for detecting variations between the rectified signal and the expected signal level, thereby producing an interference measurement.

8. A method of measuring interference associated with a received digital signal, comprising the steps of:

generating an expected signal level;

sampling the received digital signal, thereby producing a sampled digital signal;

full-wave rectifying the sampled digital signal into a rectified signal, such that the rectified signal reflects the expected signal level only when noise and interference are absent from the received digital signal; and detecting variations between the rectified signal and the expected signal level, thereby producing an interference measurement.

9. A communication unit, capable of measuring interference associated with a digital signal, the communication unit comprising:

a receiver for receiving the digital signal;

a discriminator for discriminating the received digital signal, thereby producing a discriminated signal;

a sample and hold circuit that samples and holds the discriminated signal and outputs a sampled digital signal;

a first rectifier, operatively coupled to the sample and hold circuit, that full-wave rectifies the sampled digital signal about a first level, thereby producing a rectified signal;

a second rectifier, operatively coupled to the first rectifier, that full-wave rectifies the rectified signal about a second level, thereby producing a twice-rectified signal; and a peak detector, operatively coupled to the second rectifier, that detects and measures peaks between the twice-rectified signal and the second level, thereby producing an interference measurement.

10. A method for measuring carrier to interference ratio of a received digital signal comprising the steps of:

receiving a digital signal;

sampling and holding the received digital signal and outputing a sampled digital signal;

full-wave rectifying the sampled digital signal about a first level, thereby producing a rectified signal;

detecting and measuring variations between an expected level and the first level, thereby producing an interference measurement.

* * * * *